United States Patent
Zaborsky et al.

(10) Patent No.: US 6,692,161 B2
(45) Date of Patent: Feb. 17, 2004

(54) HIGH FREQUENCY EMITTER AND DETECTOR PACKAGING SCHEME FOR 10GB/S TRANSCEIVER

(75) Inventors: Brett Zaborsky, San Jose, CA (US); Rao Peddada, San Jose, CA (US); Andrew Alduino, Santa Clara, CA (US); Douglas Crafts, San Jose, CA (US); Siegfried Fleischer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 09/823,294

(22) Filed: Mar. 29, 2001

(65) Prior Publication Data

US 2002/0150354 A1 Oct. 17, 2002

(51) Int. Cl.[7] .................................. G02B 6/43
(52) U.S. Cl. .......................... 385/92; 385/93
(58) Field of Search .............. 385/92, 93, 94

(56) References Cited

U.S. PATENT DOCUMENTS 5,295,214 A    3/1994   Card et al.
5,475,783 A  * 12/1995  Kurashima .................... 385/92

FOREIGN PATENT DOCUMENTS

WO    PCT/US 02/07012    7/2003

OTHER PUBLICATIONS

"Alignment Fixture for Radio Frequency Shield to Deck Reflow"; IBM Technical Disclosure Bulletin; IBM Corp. New York, US; vol. 34; No. 10B, Mar. 1, 1992, pp. 124–125.

* cited by examiner

Primary Examiner—Walter E. Snow
(74) Attorney, Agent, or Firm—Blakely, Sokoloff, Taylor & Zafman LLP

(57) ABSTRACT

An apparatus and packaging scheme that ensures that alignments between signal sending and detecting components in transceivers are optimized and maintained over the lifetime of the apparatus. This is accomplished through use of a pair of polymer optical modules, which are used to couple light sent to and received from respective fiber optic cables. During a pre-alignment process, head portions of the polymer optical modules are inserted into respective slots defined in a standoff that is mounted on an optical subassembly to which an emitter and detector are mounted, whereby these slots are configured so that the head portions slide along the sidewalls of the slots during assembly. During a subsequent active alignment process, each polymer optical module is positioned relative to its respective emitter or detector until a maximum signal is detected, whereupon the position of the components is quick-set using a UV-sensitive adhesive. Additional adhesive may then be added to further secure the components.

22 Claims, 7 Drawing Sheets

HIGH FREQUENCY EMITTER AND DETECTOR PACKAGING SCHEME FOR 10GB/S TRANSCEIVER

BACKGROUND OF THE INVENTION

1. Field of the Invention

The present invention generally concerns very high bandwidth transceivers, and in more particular concerns a packaging scheme for very high bandwidth transceivers in which an emitter and detector are packaged in a monolithic unit.

2. Background Information

Network communications have dramatically increased access to data, enabling larger and larger volumes of data to be transmitted. In order to facilitate the ever-increasing request for data transfers, communications systems have progressively increased their bandwidth. For example, the developers of Ethernet network technology provide standards for transfer rates of 10 megabits/second, 100 megabits/second, and 1 gigabit/second. Recently, standards are being formulated for 10 gigabit/second Ethernet networks.

Network communications involve a transfer of data between two endpoint devices (e.g., computers) that are generally coupled by one or more intermediate devices. For example, when accessing data via the Internet, the intermediate devices for the datapath (i.e., the network routing over which the data is transmitted) may comprise one or more gateways and various routers and switches. When using a local area network (LAN), the datapath typically comprises one or more hubs and/or routers. Each device in the datapath must provide appropriate connections that enable signals provided via network cabling to be received and transmitted by those devices.

To support the higher bandwidth signals, gigabit/second networks generally require optical fiber cabling, which provides several advantages over copper cabling. A fiber optic connection provides two functions: it couples a transmitter light signal produced by an emitter to the fiber optic cabling, and it provides a means for coupling a received light signal on the fiber optic cable to a receiving component, typically comprising a detector. As the bandwidth of network signals increase, their signal-to-noise ratio decreases, making the higher bandwidth signals, even when carried over fiber optic cabling, more sensitive to disturbances such as EMI radiation and the like. This requires the alignment of the components in a connector to be very precise. Additionally, increased measures must be taken to prevent external disturbances.

One conventional packaging scheme that is designed for high-bandwidth applications is known in the industry as a "TO can" package. Connectors that employ TO can packages include separate packages for coupling the transmitted signal and the received signal. The outputs of these packages are generally coupled to a circuit board that enables further routing and/or processing of the transmitted or received signals. At present, TO can packages generally support bandwidths of approximately 2.5 Gigabits/second.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides an optical sub-assembly that may be used in high-bandwidth transceivers having a packaging scheme that ensures that alignment between signal sending and detecting components is optimized and maintained over the lifetime of the device. The packaging scheme includes a pair of polymer optical modules, which are used to couple light transmitted to and received from respective fiber optic cables. During a pre-alignment process, head portions of the polymer optical modules are inserted into respective slots defined in a standoff that is mounted on an optical sub-assembly substrate to which an emitter and detector are mounted. During a subsequent active alignment process, each polymer optical module is positioned relative to its respective emitter or detector until a maximum signal is detected, whereupon the position of the components is quick-set using a UV-sensitive adhesive. Optionally, additional adhesive may be used to further secure the components. The resulting packaging scheme provides a single unit that supports both transmitter and receiver connection functions, while supporting bandwidths corresponding to 10 gigabit/second signals.

Figure 1:
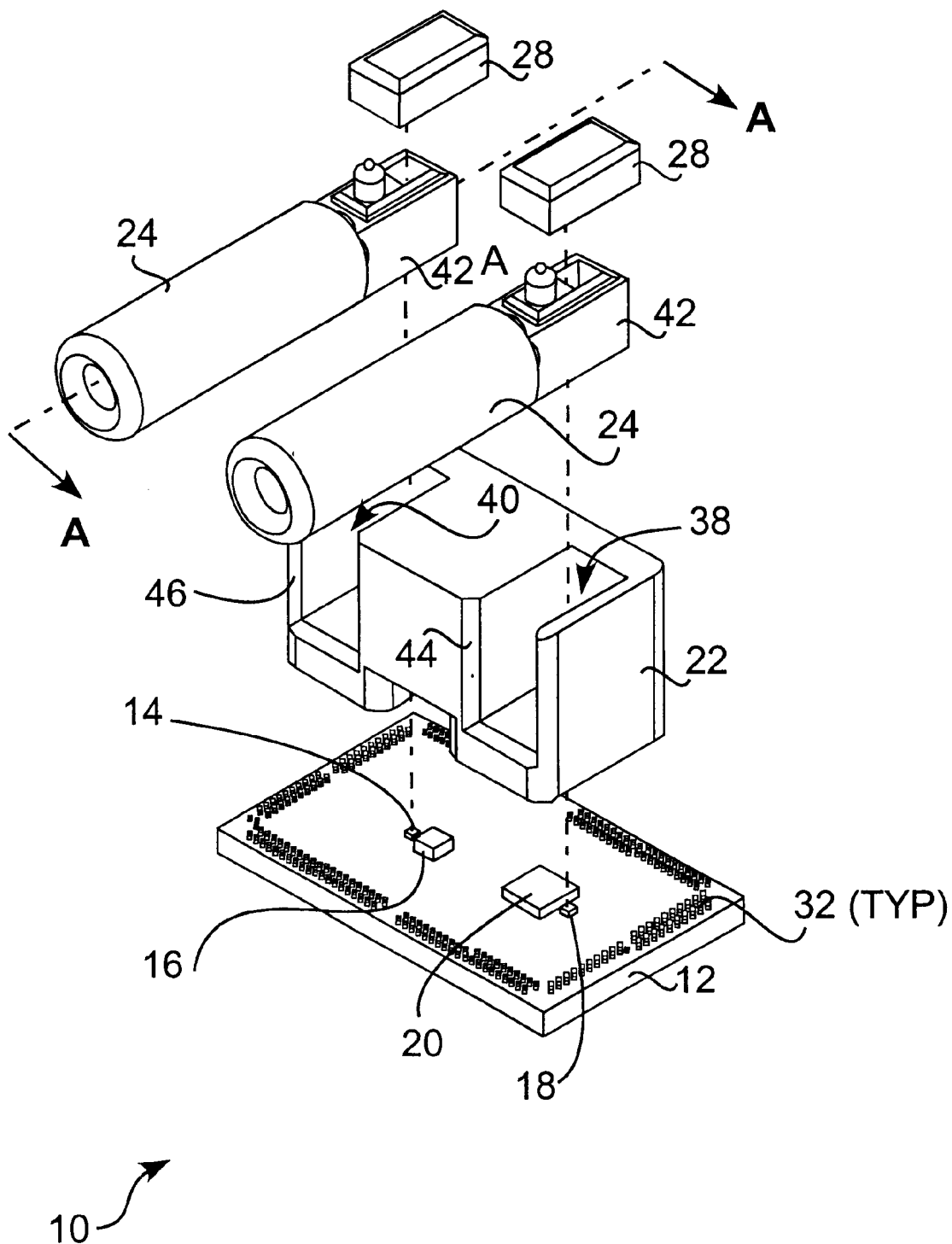
FIG. 1 is an exploded view illustrating the primary components of an optical sub-assembly having a packaging scheme in accordance with the present invention.

An exploded view illustrating the primary components of an optical sub assembly (OSA) 10 that implements the packing scheme of the invention is shown in FIG. 1. These components include an optical sub assembly (OSA) substrate 12 on which a vertical cavity surface emitting laser (VCSEL) 14, a power monitor 16, a detector 18, and an amplifier 20 are mounted. The optical sub assembly also includes a standoff 22, a pair of polymer optical modules 24, and a pair of caps 28.

VCSEL 14 is used to generate light signals that are used for high-bandwidth communication (e.g., 10 GHz/sec). In one embodiment, the wavelength of the light is approximately 800–900 nanometers(nm) (nominally 850 nm). In other embodiments, VCSEL 14 is configured to produce light with wavelengths of approximately 1300 nm and 1550 nm, respectively. In addition, other wavelengths suitable for high-bandwidth communication signal environments may also be used. Suitable components that may be used for VCSEL 14 include an Emcore (Albuquerque, N. Mex.) 8585-8050 GaAs VCSEL, or a GaAs VCSEL with similar characteristics manufactured by the Honeywell Corporation. The optical power emitted by VCSEL 14 is monitored by power monitor 16, which preferably comprises a low frequency power monitor photodiode that provides active control of the power emitted from VCSEL 14. A portion of the optical power emitted from VCSEL 14 is reflected from a lens 56 disposed above the VCSEL such that the reflected light is incident upon the aperture of power monitor 16, wherein the incident light is calibrated to represent the actual optical power output by VCSEL 14.

Detector 18 is used to detect high bandwidth (e.g., 10 GHz/sec) light signals having characteristics that are similar to the light signals produced by VCSEL 14. Suitable components for detector 18 include various GaAs detectors manufactured by the Microsemi Corporation of Santa Ana, Calif. Amplifier 20 receives low current signals from detector 18 and provides gain to the signal while also injecting as little noise as possible into the data stream. This component generally will comprise a trans-impedance (TIA)-type amplifier, or a pre-amplifier. Nortel manufactures SiGe TIA amplifiers that may be implemented to perform the functions of amplifier 20.

Preferably, power monitor 16 is wire-bonded to OSA substrate 12, which preferably comprises silicon, ceramic, or FR4. Amplifier 20 may also be wire-bonded to OSA substrate 12, or it may be electrically coupled to the OSA substrate using other techniques commonly used during electronic manufacturing, such as (wave soldering?—please fill in another method you might use). These components receive power and electrical signals via internal or surface traces in OSA substrate 12 (not shown), which are routed to a plurality of C4 solder bumps 32 disposed about the periphery of the OSA substrate.

Figure 2:
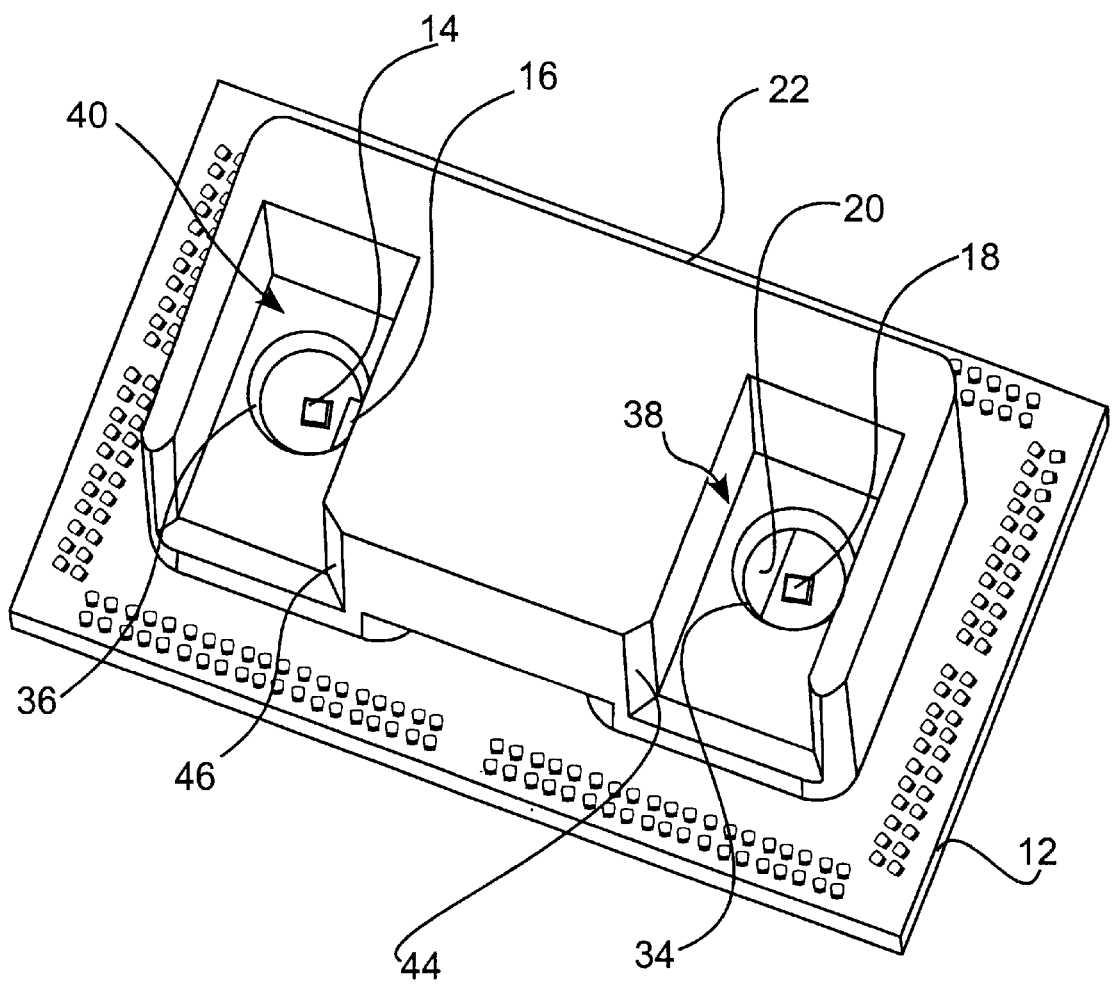
FIG. 2 is a detailed isometric view of the standoff and substrate of the optical sub-assembly of FIG. 1.

A detailed view of OSA substrate 12 and standoff 22 upon assembly is shown in FIG. 2. Standoff 22 includes a pair of substantially cube-shaped recesses 38 and 40 configured to receive a block-shaped head portion 42 of polymer optical module 24, whereby the head portions and sidewalls of the recesses slidedly engage (i.e., slide against one another) upon assembly, further details of which are described below. A pair of chamfers 44 and 46 are also defined in the openings of recesses 38 and 40, as well as a pair of countersunk holes 34 and 36. In order to enhance signal quality, standoff 22 preferably should include EMI shielding to reduce and/or prevent cross-talk between received and transmitted signals. Accordingly, in one embodiment, gold or another suitable metal is deposited one the surfaces of recesses 38 and 40, using, e.g., vapor deposition. In another embodiment, metal shielding is molded into the sidewall of recesses 38 and 40.

Figure 3A:
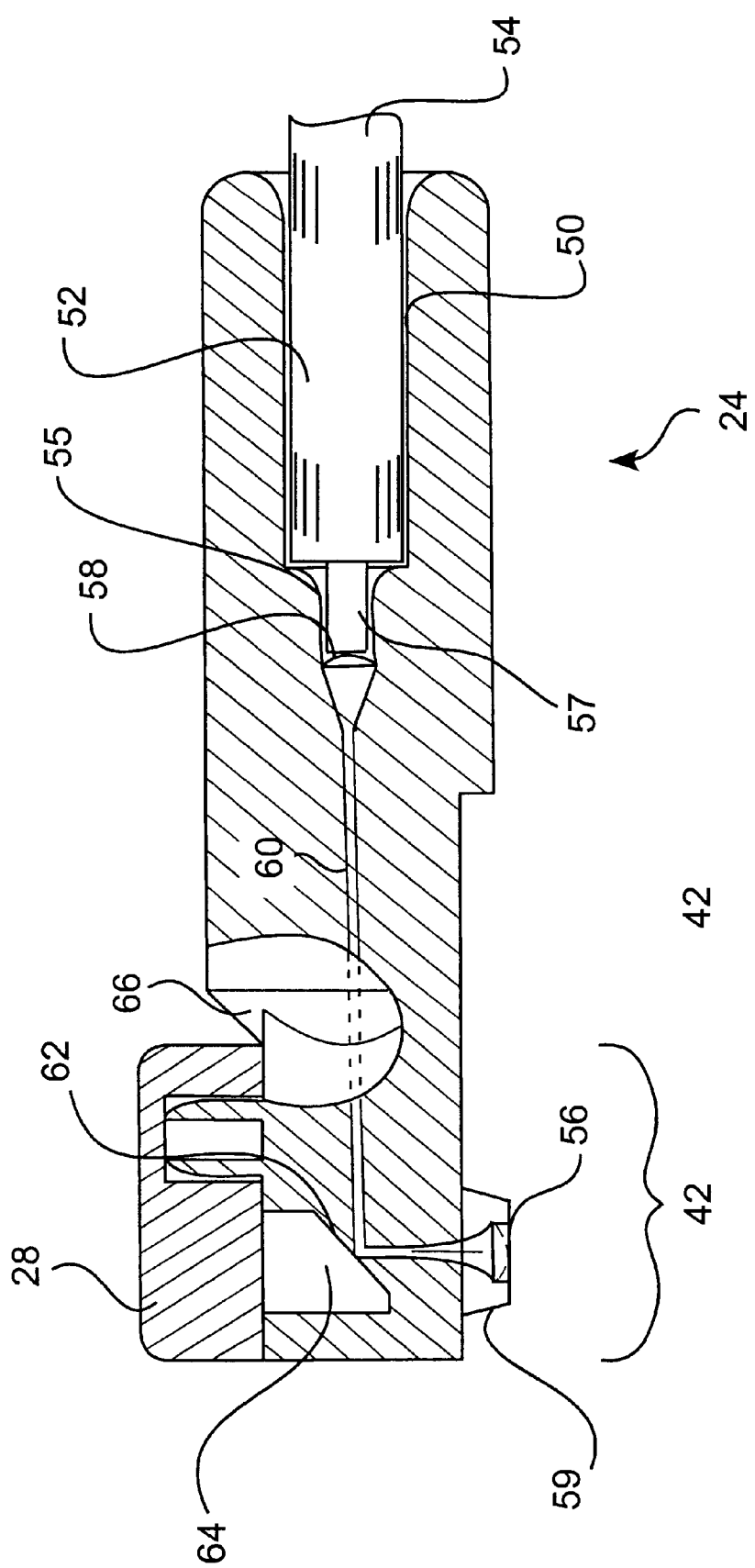
FIGS. 3A and 3B respectively show detailed elevation and isometric views of the polymer optical module used in the optical sub-assembly.
Figure 3B:
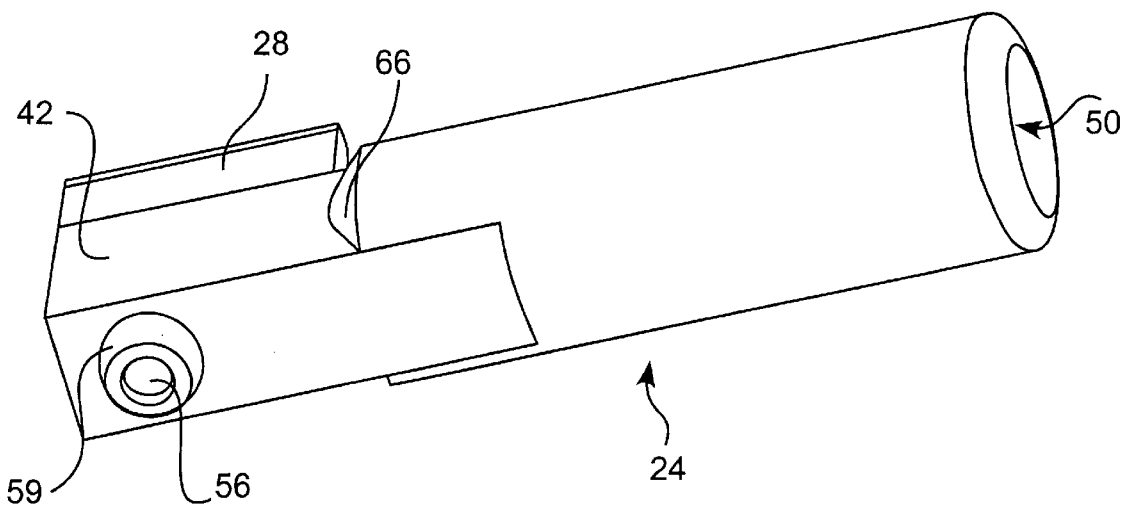
Figure 4:
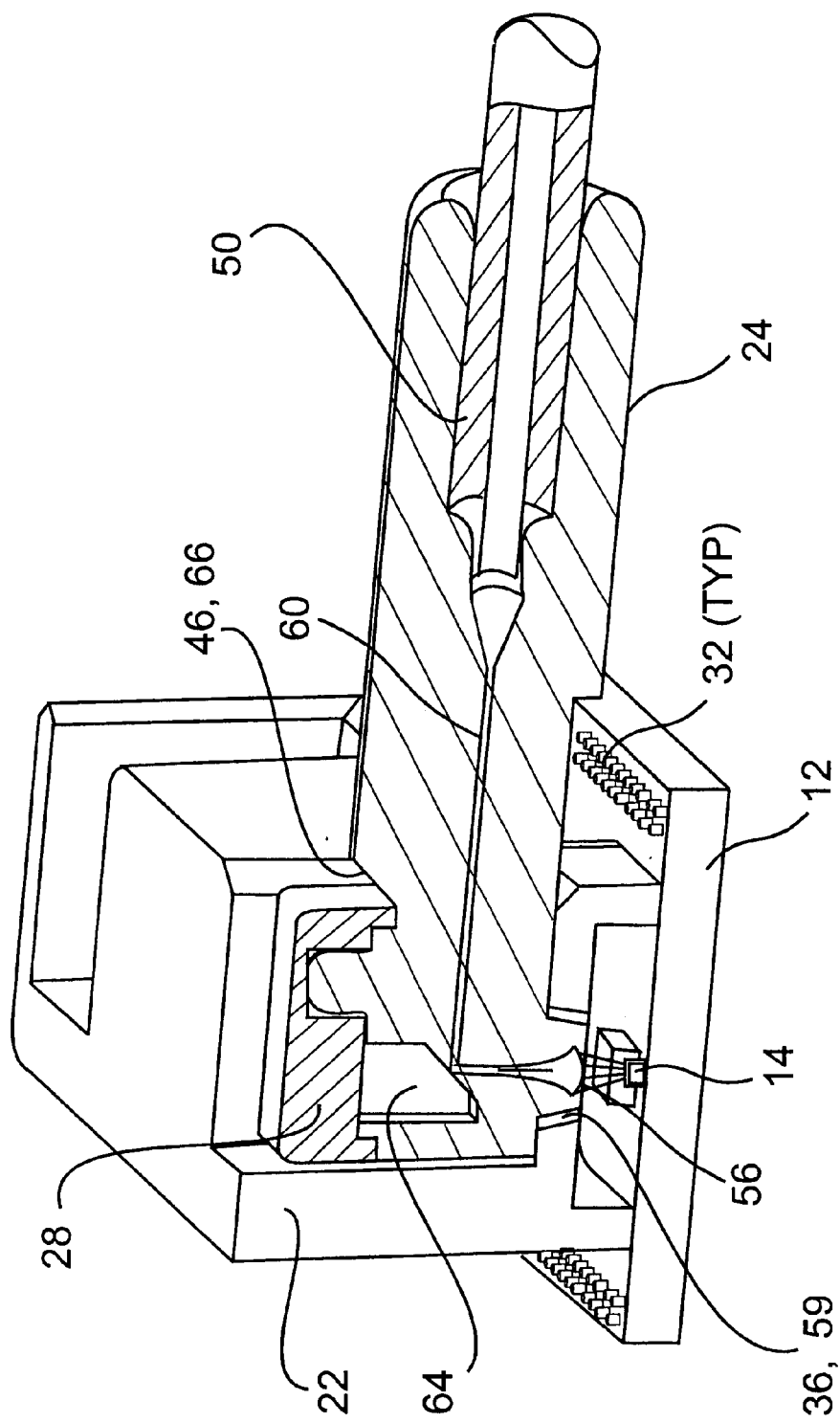
FIG. 4 is a cross-sectional view of a polymer optical module, standoff, and substrate taken along section cut AA in FIG. 1.

The polymer optical modules are used to redirect light being produced by VCSEL 14 so that it may be received by a fiber optic cable, and redirect light received from a fiber optic cable so that it may be received at detector 18. Accordingly, polymer optical module 24 is made of a material that enables passage of light having a wavelength corresponding to the light signals used for the high-bandwidth environments the apparatus is to be used in. For example, in one embodiment the wavelength of the light is approximately 800–900 nm. As discussed above, 1300 nm and 1550 nm light signals may also be used, as well as other wavelengths. Polymer optical module 24 also includes a cylindrical bore 50 defined in one end that is configured to receive an end portion 52 of a fiber optic cable 54, as shown in FIGS. 3A, 3B and 4. Bore 50 also includes a stepped down portion 55 for receiving a fiber end or area 57 of fiber optic cable 54. Materials suitable for polymer optical module 24 include Ultem 1000, a polymer manufactured by General Electric, which has a coefficient of refraction of approximately 3.

Polymer optical module 24 includes a pair of lenses 56 and 58 that are used to collimate incoming and outgoing light signals, as depicted by a light pathway 60. Preferably, lenses 56 and 58 are formed directly into polymer optical module 24. Optionally, lenses 56 and/or 58 may comprise separate components that are mounted within the module. Polymer optical module 24 preferably has a cylindrical shape over most of its length with a chamfer 66 defined toward the head end that mates with chamfer 44 or 46.

Polymer optical module 24 also includes a recess 64, which is preferably filled with air. As light travels along light pathway 60, it impinges upon a surface 62 defined in recess 64, whereupon the light is redirected approximately 90 degrees. This "mirroring" effect is produced by the different coefficients of refraction on the two sides of surface 62 (3 for Ultem 1000,1 for air). Cap 28 is used to ensure that the air in recess 64 remains free of dust and other impurities In order to maximize performance, the alignment of VCSEL 14 and detector 18 relative to lenses 56 in polymer optical modules 24 need to be precisely controlled. Accurate alignment of these components is enabled through a two-phase pre-alignment and active alignment process. The pre-alignment phase ensures that minimal positional adjustment needs to be performed during the active alignment phase. This is a result of minimizing the tolerance stack up of the assembly. Accordingly, VCSEL 14 and detector 18 are positioned relative to a known datum or registration point on OSA substrate 12 so as to have a position error of approximately +/−20 μm. Furthermore, countersunk holes 34 and 36 are positioned relative to a known datum or reference point on OSA substrate 12 to have a position error of +/−20 μm upon assembly. The OSA substrate and standoff preferably are assembled using an epoxy or a similar adhesive. Finally, the depth of recesses 38 and 40 are precisely controlled such that the focal point of lens 56 falls upon emitter 14 or detector 18, as appropriate.

In order to obtain the foregoing alignment results, various surfaces and features on standoff 22 and polymer optical modules 24 must be very accurate. Accordingly, standoff 22 and polymer optical modules 24 will require a precision manufacturing process, such as precision injection molding. In alternate embodiments, these precision surfaces and features may be obtained using post-molding machining operations.

Figure 5:
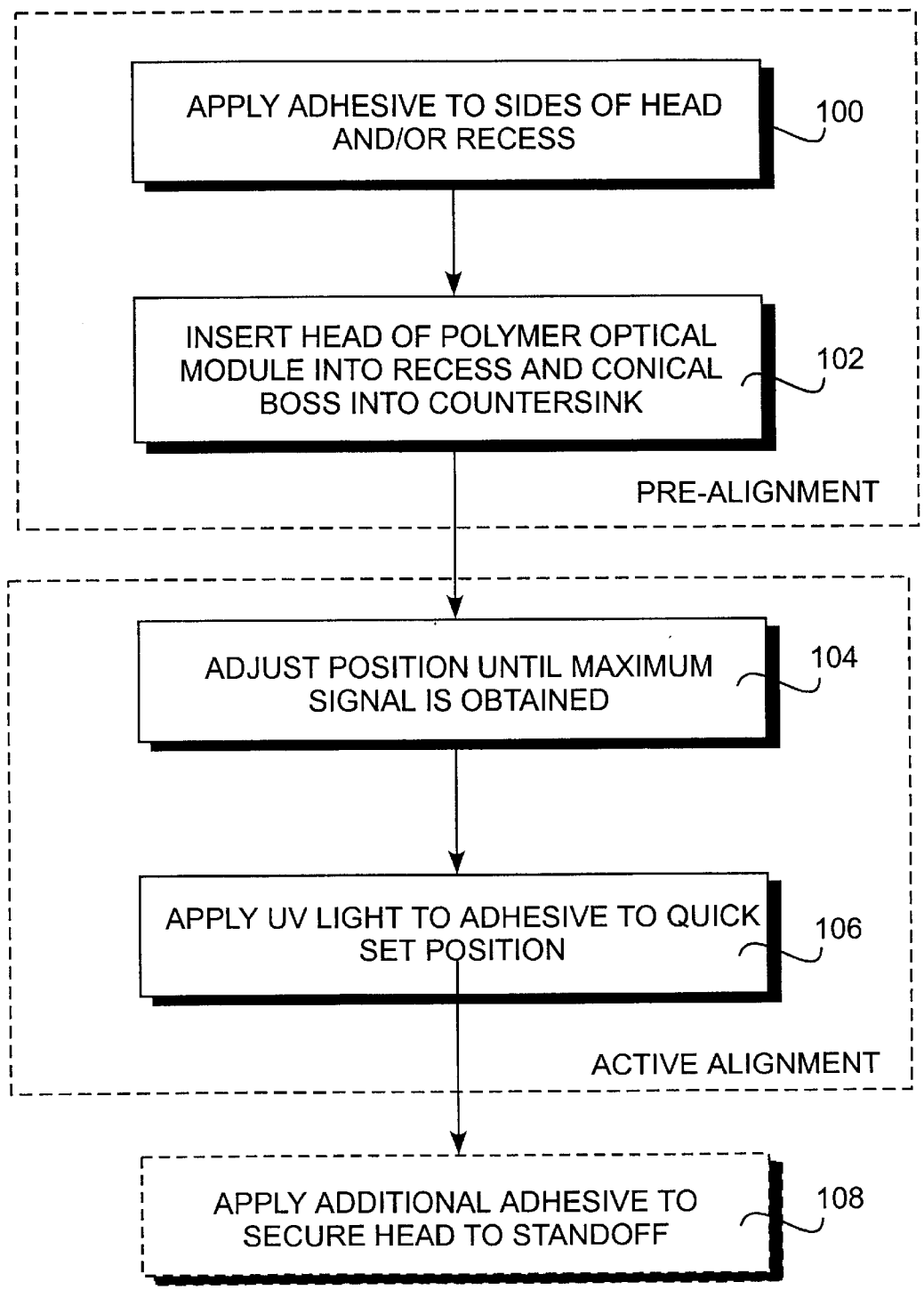
FIG. 5 is a flowchart illustrating the alignment process used during assembly of the optical sub-assembly.
Figure 6:
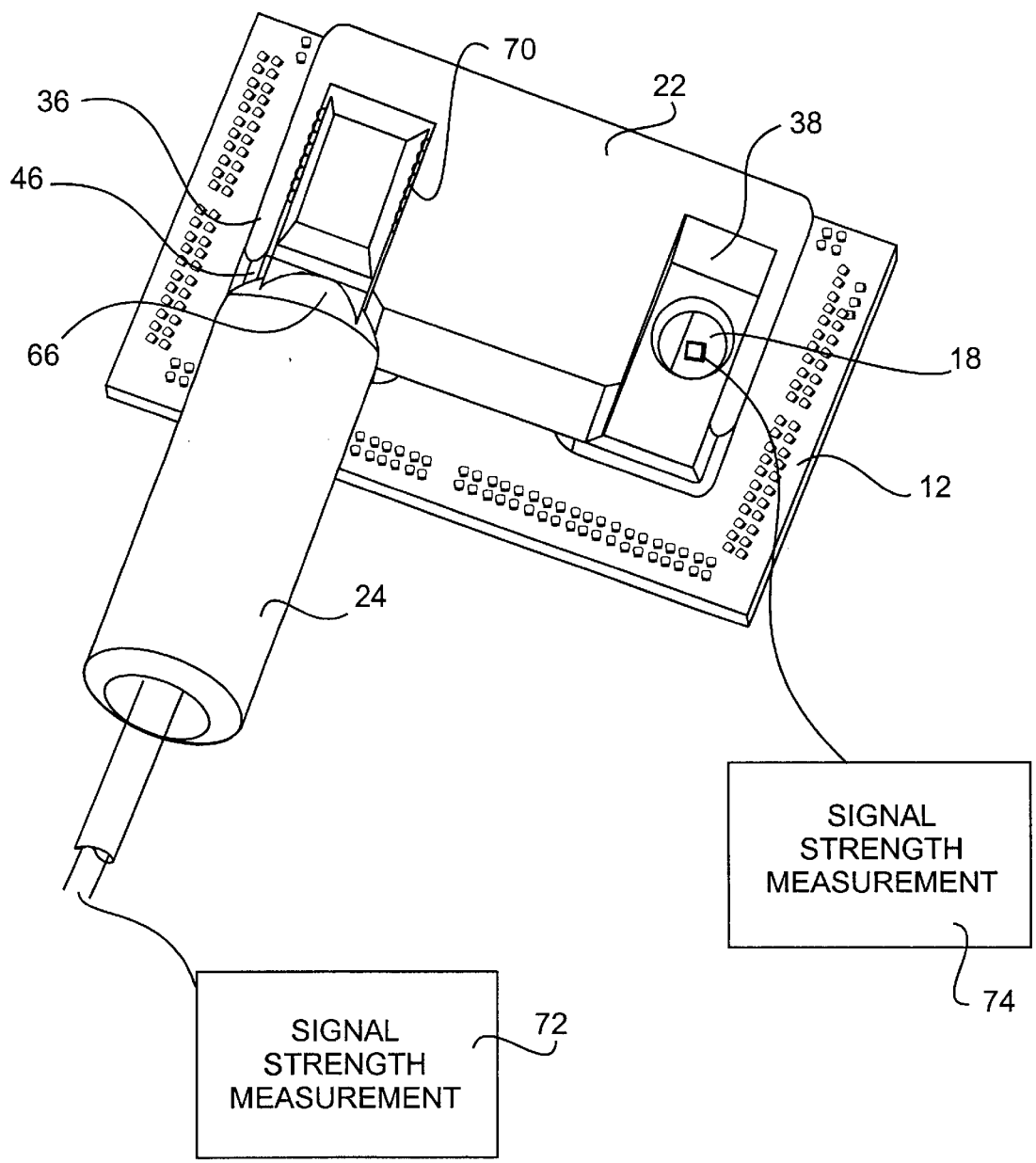
FIG. 6 is an isometric view of the optical sub-assembly that is used for illustrating an alignment of a polymer optical module.

With reference to the flowchart of FIG. 5, the pre-alignment phase begins in a block 100 in which an adhesive 70 is applied to the sides of head 48 and/or the sides and/or bottom of recess 40. Optionally, adhesive 70 may be inserted into the gap between the sides of head 48 and recess 40, as shown in FIG. 6, after the step performed in block 102 discussed below. Preferably, adhesive 70 will comprise a cyanoacrylate or epoxy that is sensitive to ultra-violet (UV) light, such that the adhesive rapidly cures when exposed to UV light. Optionally, adhesive 70 may comprise two or more adhesives, wherein one of the adhesives is sensitive to UV light, while the other adhesive(s) provides additional rigidity to the assembly upon being cured, such as various well-known high-strength epoxies.

Next, in a block 102, a head portion 42 of a polymer optical module 24 is inserted into a recess 38 (or 40) and frustro-conical boss 58 is inserted into countersunk hole 36 (or 34). The size and configuration of the various features on the mating parts is such that there is a slight gap defined between the sides of head 42 and respective sides of the recess, and there is approximately 100 μm of play between the angled surfaces of the countersink and cone of frustro-conical boss 58. At this point, the pre-alignment phase of the alignment process is complete.

The next part of the alignment process comprises an active alignment of each polymer optical module 24 relative to standoff 22 (and thus VCSEL 14 and detector 18). As provided by a block 104, this is accomplished by adjusting the position of each polymer optical module 24 while measuring either an output signal strength of the light produced by VCSEL 14 or the strength of an input signal as measured by detector 18 (as appropriate for that polymer optical module), wherein positioning continues until a maximum signal is detected. The signal strength measurement is depicted as blocks 72 and 74 in FIG. 6.

Upon detection of a maximum signal, UV light is applied to adhesive 70 in a block 106 to quick-set the position. If it hasn't been previously added above, additional adhesive, such as a high-strength epoxy, may then be applied in the gap between the sides of head 48 and recess 36 to secure the position, as provided by a block 108.

A similar alignment process is then performed on the polymer optical module for the other side. Optionally, active alignment of both polymer optical modules 24 may be performed substantially simultaneously.

After the adhesive(s) have cured, the resulting assembly comprises a monolithic high-density SFF (Small Form Factor) connector suitable for use in Gigabit transceivers, allowing for horizontal fiber coupling. Due to the active alignment process, the signal strength of the transceiver is maximized.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. An apparatus comprising:
   a substrate on which a light emitter and a light detector are mounted;
   a first optical module adapted to optically couple light received from a first optical to the light detector;
   a second optical module adapted to optically couple light produced by the light emitter to a second optical cable; and
   a standoff fixedly mounted to the substrate to which each of the first and second optical modules are fixedly secured,
   wherein each of the first and second optical modules include a head portion and wherein the standoff includes two recesses defined therein adapted to slidedly engage a head portion of a respective optical module during an assembly operation, each of said head portions being fixedly secured within a respective recess upon completion of the assembly operation.

2. The apparatus of claim 1, wherein each of the first and second optical modules includes a boss extending outward from the head portion of that optical module and wherein a respective hole is defined in a base portion of each of the recesses that is adapted to substantially mate with a respective boss during the assembly operation.

3. The apparatus of claim 2, wherein the boss comprises a frustro-conical shape defining a cone angle, and each hole includes a countersink having an angle substantially matching the cone angle.

4. The apparatus of claim 1, wherein each of the first and second optical modules include a bore adapted to couple to an end portion of an optical cable, a first lens for collimating light received from or directed to the optical cable, and a second lens for collimating light received from the light emitter or being directed toward the light detector.

5. The apparatus of claim 4, wherein each of the first and second optical modules comprise a single piece polymer structure.

6. The apparatus of claim 4, wherein the first and second lenses of each of the first and second optical modules are disposed approximately 90 degrees from one another, and each optical module further includes a recess filled with a material having a coefficient of refraction different than a coefficient of refraction of a material from which the optical modules are made and defining a reflection surface such that light received by one of the first and second lenses is redirected toward the other lens.

7. The apparatus of claim 6, wherein each of the first and second optical modules further includes a respective cap that covers the recess to prevent impurities from entering the recess.

8. The apparatus of claim 1, wherein the light emitter comprises a vertical cavity surface emitting laser (VCSEL).

9. The apparatus of claim 1, wherein the first optical module is positioned relative to the light detector such that a maximum amount of light received from the first optical cable is directed toward the light detector.

10. The apparatus of claim 9, wherein the first optical module is positioned relative to the light detector using an active alignment process wherein an alignment between the first optical module and the light detector is adjusted until a maximum signal is detected at the light detector, whereupon the alignment is fixedly secured.

11. The apparatus of claim 1, wherein the second optical module is positioned relative to the light emitter such that a maximum amount of light produced by the light emitter is received by the second optical cable.

12. The apparatus of claim 11, wherein the second optical module is positioned relative to the light emitter using an active alignment process wherein an alignment between the second optical module and the light emitter is adjusted until a maximum signal is detected at the second optical cable, whereupon the alignment is fixedly secured.

13. The apparatus of claim 1, wherein the substrate further includes a plurality of solder bumps to connect to an external component, a portion of which are electrically coupled to the light emitter and light detector.

14. The apparatus of claim 1, wherein the standoff further includes shielding disposed along sidewalls of its two recesses to prevent cross-talk between light signals passing through the head portions of the first and second optical modules.

15. The apparatus of claim 1, further including an amplifier mounted to the substrate that receives a light detection signal output by the light detector, and a power monitor mounted to the substrate that actively controls a power level supplied to the light emitter.

16. A method for assembling an apparatus comprising:
   pre-aligning a first optical module to a light detector, said first optical module adapted to optically couple light received from a first optical cable to the light detector;
   pre-aligning a second optical module to a light emitter, said second optical module adapted to optically couple light produced by the light emitter to a second optical cable;
   actively aligning the first optical module to the light detector to produce a first optimal alignment wherein a signal detected by the light detector is maximized;

actively aligning the second optical module to the light emitter to produce a second optimal alignment wherein a signal produced by the light emitter is maximized; and fixedly securing the first and second optimal alignments.

17. The method of claim 16, further including:

applying an adhesive to a portion of the first and second optical modules; and causing the adhesive to rapidly cure to secure the first and second optimal alignments.

18. The method of claim 16, wherein each of the first and second optical modules is secured to a standoff mounted to a substrate to which the light detector and light emitter are mounted.

19. The method of claim 18, wherein the standoff includes a pair of recesses adapted to slidedly engage head portions of the first and second optical modules during a pre-alignment process so as to pre-align the first optical module to the light detector and pre-align the second optical module to the light emitter.

20. The method of wherein the standoff further includes a pair of holes defined in the bottom of respective recesses, and each of the first and second optical modules includes a boss extending outward therefrom, further comprising mating the boss of each optical module with a respective hole during the pre-alignment process.

21. The method of claim 19, wherein active alignment of the first optical module comprises adjusting a position of the first optical module relative to the light detector until a maximum signal is detected at the light detector.

22. The method of claim 18, wherein active alignment of the second optical module comprises adjusting a position of the second optical module relative to the light emitter until a maximum signal is detected at the second optical cable.

\* \* \* \* \*